Patented Oct. 3, 1944

2,359,373

UNITED STATES PATENT OFFICE 2,359,373

ANTHRAQUINONE COMPOUNDS

Henry R. Lee and William Dettwyler, Pitman, N. J., assignors to E. I. du Pont de Nemours & Company, Wilmington, Del., a corporation of Delaware No Drawing. Application February 21, 1942, Serial No. 431,900

2 Claims. (Cl. 260—376)

This invention relates to the preparation of anthraquinone compounds and more particularly to the preparation of anthraquinone thiosalicylic acids.

It has heretofore been the practice in the preparation of anthraquinone thiosalicylic acids to react a halogen anthraquinone compound with thiosalicylic acid in alcohol as a reaction medium. Thio-salicylic acid (ortho-mercaptobenzoic acid) has heretofore been obtained by reduction of di-(thiosalicylic acid) which is also referred to as diphenyl-disulfide-o,o'-dicarboxylic acid which has the formula:

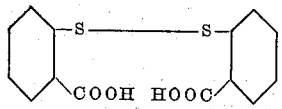

with a suitable reducing agent. The monothiosalicyclic acid was then condensed with a halogen containing anthraquinone compound in absolute alcohol (British Patent 13,907—1911).

It is an object of the present invention to provide a simple and economical process for the preparation of anthraquinone thiosalicylic acids. It is a further object of the invention to provide a process wherein the halogen anthraquinone may be reacted with thiosalicylic acid in water. A further object of the invention is to produce new and valuable thiosalicylic acids.

We have found that halogen anthraquinones which may contain further substituents will react readily with di-(thiosalicylic acid) in the absence of a reducing agent in water and in the absence of organic solvents, to produce the anthraquinone thiosalicylic acids in high yield and of good purity. In view of the fact that both the halogen anthraquinones and the di-(thiosalicylic acids) are insoluble in water it was entirely unexpected that this reaction could be carried out in water alone and in the absence of reducing agents when the di-(thiosalicylic acid) is employed. It is of course understood that when desired the thiosalicylic acid (mono) may be employed in this reaction although in view of this fact that this mono-thiosalicylic acid must be produced from the di-(thiosalicylic acid) there is no advantage in adding to the cost of the process by employing the mono-thiosalicylic acid.

According to our invention the halogen anthraquinone, (either the chloro- or bromo-derivatives) and the di-(thiosalicylic acid) are heated in water in the presence of caustic potash at temperatures, preferably of about 140–160° C. To attain such temperatures in water, and in the absence of a solvent the reaction must be carried out under pressure. Any pressure may be used that will permit attaining the temperature required to complete the reaction. Only a small excess of the di-(thiosalicylic acid) is required to carry the reaction to completion. After condensation is complete the mass is cooled and drowned in water. Sufficient caustic potash should be present to keep the drowned mass alkaline so that the anthraquinone thiosalicylic acid-alkali metal salt will be retained in solution during the filtering and clarification steps, after which the solution is acidified to precipitate the anthraquinone-thiosalicylic acid.

The following examples are given to illustrate the invention although it is to be understood that the invention is not limited to the particular anthraquinone derivatives employed in these examples for the reaction can be carried out with any substituted anthraquinone in which the additional substituent is not reactive under the conditions employed. In the examples the parts are given by weight.

*Example I.*—Charge a steel autoclave with 1150 parts of water and add 150 parts of potassium hydroxide, 150 parts of di-(thiosalicylic acid) and 230 parts of 1-chloro-5-amino-anthraquinone. Close the autoclave and heat to 150° C. Maintain at from 150° to 152° C. for 6 hours. The pressure remains constant at about 70 pounds per square inch. Cool the autoclave to room temperature and discharge the contents into 10,000 parts of warm water, add 20 parts caustic potash to assure that the solution is maintained alkaline and heat to a boil. An orange-red solution is obtained. Add Filter-Cel for clarification and filter the hot solution. Cool the filtrate to room temperature and acidify slowly with hydrochloric acid. Filter the precipitate and wash acid-free and dry. The 5-amino-anthraquinone-1-thiosalicylic acid is obtained in a high yield. Ring-closure in chloro-sulfonic acid will give 5-amino-anthraquinone-2:1(S)-thioxanthone.

*Example II.*—Charge a steel autoclave with 275 parts of water, add 35 parts of caustic potash flakes, 35 parts di-(thio-salicylic acid) and 50 parts of 1-chloro-8-amino-anthraquinone. Close the autoclave and heat to 150° and maintain at from 148° to 150° C. for 6 hours. The maximum pressure recorded is 70 pounds per square inch. After cooling the charge to room temperature, discharge into warm water, add 7 parts of caustic potash, bring the volume to approximately 4000 parts and heat to a boil. Filter the hot orange solution using Filter-Cel as a filter-aid. Cool the filtrate to room temperature and acidify with hydrochloric acid, filter, wash acid-free and dry. A high yield of 8-amino-anthraquinone-1-thio-salicylic acid is obtained. Ring-closure will give the 8-aminoanthraquinone-2:1(S)-thioxanthone.

*Example III.*—When 1-chloro-4-aminoanthraquinone is condensed in the same manner, 4-aminoanthraquinone-1-thiosalicylic acid is obtained in a high yield.

*Example IV.*—Prepare a solution of 66 parts of di-(thio-salicylic acid), 66 parts of caustic potash in 500 parts of water and charge into an autoclave, add 100 parts of 1-chloroanthraquinone, close the autoclave and heat to 150° C. Maintain at 148–150° C. for 6 hours. Cool the autoclave to room temperature and dilute the contents with water to 5000 parts, heat to the boil and filter the orange solution. Acidify the filtrate with HCl, filter, wash acid-free and dry. Anthraquinone-1-salicylic acid is obtained in an excellent yield. Ring-closure of this product will give 2:1(S)-anthraquinone-thioxanthone.

*Example V.*—Charge an autoclave with 500 parts of water, add 60 parts of caustic potash, 60 parts of di-(thio-salicylic acid) and 50 parts of 1:5-dichloroanthraquinone. Close the autoclave and heat to 150° C. and hold at 150–152° for 8 hours. A maximum pressure of 40 pounds is attained. Cool the autoclave to room temperature, dilute the contents with water to 4000 parts, heat to the boil and filter. Acidify the filtrate with hydrochloric acid, filter and wash acid-free and dry.

Anthraquinone 1:5-di-thio-salicylic acid is obtained in a very high yield.

*Example VI.*—Charge the autoclave with 500 parts of water, add 35 parts of caustic potash, 35 parts of di-(thio-salicylic acid) and 50 parts of 1-amino-6-chloroanthraquinone. Heat at 150° C. for 6 hours. The maximum pressure attained is 90 pounds per square inch. Cool the autoclave and dilute the charge with 4000 parts of water, heat to the boil, clarify with Filter-Cel and filter. Acidify the filtrate with hydrochloric acid, filter, wash the cake with water and dry. 1-aminoanthraquinone-6-thio-salicylic acid is obtained in high yield.

*Example VII.*—When 2:6-di-chloroanthraquinone is used instead of 1:5-di-chloroanthraquinone as in Example V, anthraquinone-2:6-di-thiosalicylic acid is obtained.

*Example VIII.*—1:6-di-chloroanthraquinone treated in the same manner yields anthraquinone-1:6-di-thiosalicylic acid.

*Example IX.*—Heat in an autoclave at 150° for 8 hours the following charge: 500 parts of water, 50 parts of caustic potash, 50 parts of di-(thiosalicylic acid) and 25 parts of 1:4:5:8-tetra-chloroanthraquinone. After working up as described in the foregoing examples, anthraquinone-1:4:5:8-tetra-thiosalicylic acid is obtained in high yield. It is a blue powder, soluble in alkali with a blue violet color and in concentrated sulfuric acid with a blue-green color. It dissolves with a purple color in organic solvents.

When 1:4:5-tri-chloroanthraquinone is reacted with di-(thiosalicylic acid) in the same manner the 1:4:5-tri-thiosalicylic acid is obtained in high yields.

*Example X.*—When 1-amino-2-chloroanthraquinone is treated in the autoclave with an alkaline solution of di-(thiosalicylic acid) 1-aminoanthraqnuinone-2-thiosalicylic acid is obtained. Ring-closure in chloro-sulfonic acid gives 1-aminoanthraquinone-3:2(S)-thioxanthone.

*Example XI.*—When 1-amino-3-bromoanthraquinone is used for the condensation the resulting product is 1-aminoanthraquinone-3-thiosalicylic acid.

*Example XII.*—Charge into an autoclave 25 parts of 1:3:5:7-tetra-chloroanthraquinone, 38 parts of di-(thiosalicylic acid), 38 parts of caustic potash and 400 parts of water, and heat at 150° for 8 hours, dilute the charge to 4000 parts, heat to the boil, filter and wash the cake free of color. Acidify the filtrate with hydrochloric acid, filter and wash the resulting cake with water. The resulting compound is anthraquinone-1:3:5:7-tetra-thiosalicylic acid. It is an orange powder which is soluble in dilute alkali with an orange color and in concentrated sulfuric acid with a purple color. It is only sparingly soluble in organic solvents with an orange color.

We claim:

1. In the process for preparing anthraquinone-thiosalicylic acids the step which comprises reacting a halogen anthraquinone with di-(thiosalicylic acid) in water and in the presence of caustic potash by heating the mass under pressure to reaction temperature.

2. In the process for preparing amino-anthraquinone-thiosalicylic acids the step which comprises heating an amino-halogen-anthraquinone in an aqueous caustic potash solution with di-(thiosalicylic acid) under pressure at temperatures of from 140° to 160° C.

HENRY R. LEE.
WILLIAM DETTWYLER.